United States Patent Office 2,808,479
Patented Oct. 1, 1957

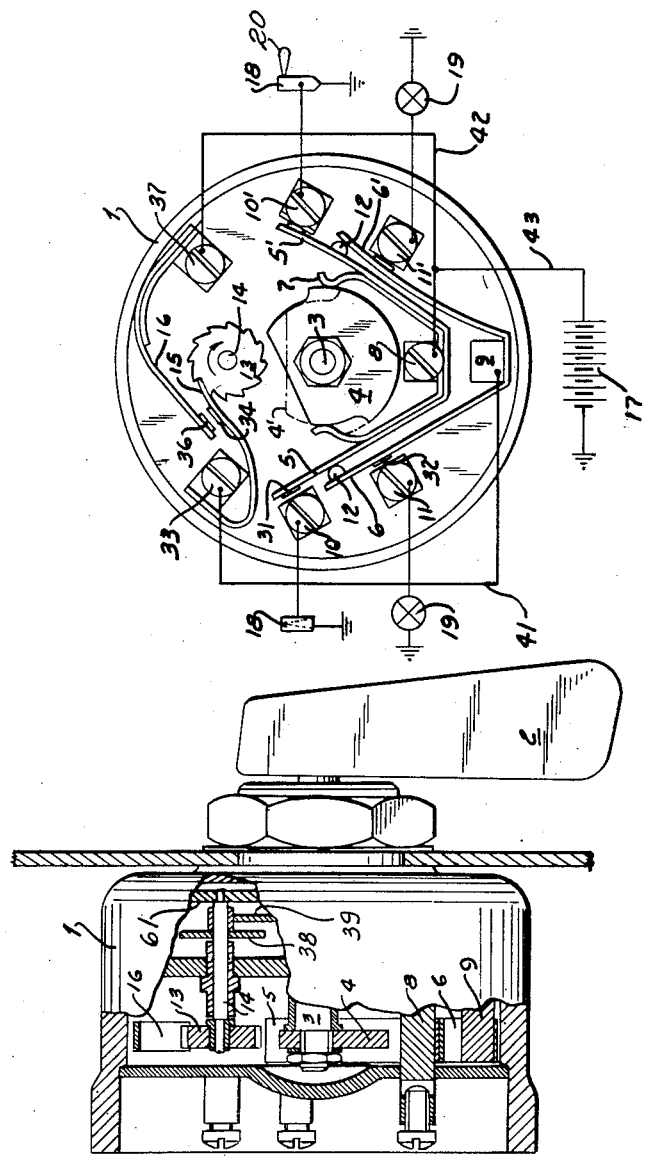

2,808,479

SWITCHING MECHANISM

Albin Buchmann, Solothurn, Switzerland, assignor to Scintilla Ltd., Soleure, Switzerland Application January 12, 1955, Serial No. 481,449

Claims priority, application Switzerland January 19, 1954

5 Claims. (Cl. 200—35)

The present invention relates to a switching mechanism. More particularly, it relates to a switching mechanism which may be used for energizing turn indicator means for automotive vehicles and the like.

It is an an object of the present invention to provide a new and improved switching mechanism adaptable for use with a turn indicator in automotive vehicles.

Another object of the present invention is to provide a new and improved apparatus for constantly energizing a first turn indicator for a predetermined time interval while repeatedly and alternately energizing a second turn indicator during the same time interval.

A further object of the present invention is to provide an improved switching mechanism for alternately closing one of a plurality of switches for a predetermined time interval while repeatedly opening and closing another switch during the same predetermined time interval.

With the above objects in mind, the present invention includes a switching mechanism having a base member, a first, a second and a third switch mounted on the base member, the first switch being connected in series with the second and third switches, and means for alternately operating one of the second and third switches for a predetermined time interval and repeatedly and alternately closing and opening the first switch during the same time interval.

Another embodiment of the present invention includes a switching mechanism having a base member, a shaft pivotally mounted on the base member, the shaft being normally maintained in a central position, means for limiting the rotation of the shaft away from its central position and permanently urging the shaft towards its central position, rate limiting means for limiting the speed at which the shaft is urged towards its central position so that the shaft is returned to its central position after a predetermined time interval, a plurality of first switch contact pairs in normally open position mounted on the base member, each of the pairs having a movable contact and a stationary contact, switch closing means mounted on the shaft in operative relation with respect to the movable contacts of the switch contact pairs, at least one second switch contact pair being connected in series with at least one of the first switch contact pairs and being in normally open position, and means for repeatedly and alternately closing and opening the second switch contact pair, mounted on said base member and operated by the rate limiting means, whereby rotation of the shaft away from its central position causes the switch closing means to close at least one of the first contact pairs, the switch closing means being operative during the predetermined time interval and the second switch contact pair being repeatedly and alternately closed and opened during the same predetermined time interval.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a side view of the apparatus with the housing thereof partially broken away to show the entire constructional details;

Fig. 2 is a plan view of the bottom of the interior of the housing of the switch mechanism.

Figure 3:
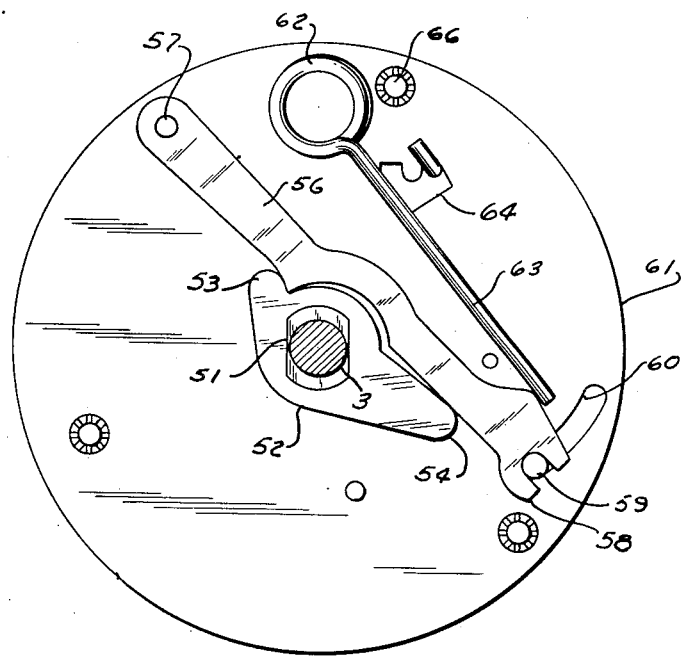
Fig. 3 is a plan view of the top plate of the switch mechanism.

Referring now to the drawings, and in particular to Figs. 1 and 2, it will be seen that the switch mechanism is mounted on a base member 1 and is operated by a hand lever 2 connected to a shaft 3 extending through the base member 1. Mounted on the interior end of the shaft 3 is a cam member 4 shown in a position slightly rotated from its normal central position indicated by the dotted line 4'.

The cam 4 makes mechanical contact with an inner spring 7 symmetrically arranged with respect to the cam 4 and mounted on a terminal 8. Also symmetrically mounted on the terminal 8 is a spring having opposite arms 5 and 5'. At the extremities of the spring arms 5 and 5' are mounted electrically conductive contacts 31.

Beneath the terminal 8 is a second mounting member 9 on which is mounted a third spring having equal and oppositely extending arms 6 and 6'. Mounted near the ends of the spring arms 6 and 6' are insulating separators 12. Also mounted on each of the spring arms 6 and 6' on the sides opposite from the insulators 12 are contacts 32.

In viewing Fig. 2, spring arms 5 and 6 are shown in their normal position while spring arms 5' and 6' are shown in their operated positions. In its operated position the contact 31 on spring arm 5' makes electrical contact with a mating contact on terminal 10' and the contact 32 mounted on the spring arm 6' makes electrical contact with a mating contact on terminal 11'. Connected to the terminal 11' is one end of a light indicator 19, the other end of which is connected to ground. Connected to the terminal 10' is one end of a turning indicator mechanism 18, the other end of which is connected to ground.

Similarly, a second light 19 and turning indicator 18 are respectively connected to terminals 11 and 10.

Mounted above the shaft 3 in the base member 1 is a second shaft 14 at one end of which is mounted a ratchet 13. The ratchet 13 makes mechanical contact with a spring arm 15 mounted on a terminal 33. At the end of the spring arm 15 adjacent the ratchet 13 is mounted a contact 34 which can be mated with a contact 36 mounted on the end of a spring arm 16. The other end of the spring arm 16 is mounted on a terminal 37.

To the other end of the shaft 14 is connected a gear 38 which meshes with a second gear 39. The gear 39 is driven by a clockwork having an escapement mechanism which is wholly conventional and is not illustrated in order to avoid unnecessarily complicating the drawing.

In the remaining electrical means of Fig. 2 the terminal 9 is connected to the terminal 33 by a conductor 41 and the terminal 8 is connected to the terminal 37 by a conductor 42. The terminal 8 is also connected to the positive pole of a battery 17 by a conductor 43, the negative pole of battery 17 being connected to ground. In the event that the switching mechanism is used with an automotive vehicle the battery 17 may be the same storage battery normally used with these vehicles.

In operation, in the normal position 4' of the cam 4 all of the switches, each being made up of a pair of contacts, are normally maintained in open position. If the lever 2 is actuated to rotate the shaft 3 in a corresponding direction, the cam 4 is rotated to the position illustrated in Fig. 2 and vice-versa. The maximum rotation of the shaft 3 is limited by means to be described hereinbelow.

The operation of the cam 4 to the position shown in Fig. 2 forces the spring 7 against the spring arm 5' so that its contact 31 makes electrical contact with the terminal 10'. Accordingly, the turning indicator 18 is energized by means of the positive pole of the battery 17, the conductor 43, the terminal 8, the electrically conductive spring arm 5', and the electrically conductive terminal 10'. The movement of the spring arm 5' towards the terminal 10' also causes deflection of the spring arm 6' by means of the insulating member 12.

The deflection of the spring arm 6' brings about the mating of its contact 32 with the terminal 11'. Since this contact pair at the terminal 11' is connected in series with the switch made up of contacts 34 and 36, the light 19 will not be energized unless contacts 34 and 36 mate with each other. Mating of contacts 34 and 36 is brought about by the rotation of the ratchet 13 in the direction of the arrow. When these contacts are closed the light 19 is energized by the circuit including the positive pole of the battery 17, the conductor 43, the conductor 42, the electrically conductive spring arm 16, contacts 36 and 34, the electrically conductive spring arm 15, the electrically conductive terminal 33, the conductor 41, the electrically conductive terminal 9 and the spring arm 6'.

The speed of rotation of the ratchet 13 is limited by the aforementioned escapement mechanism. Accordingly, the number of openings and closings of the switch contacts 34 and 36 is determined by the number of teeth on the ratchet 13, its speed of rotation and the time interval during which it rotates. The time interval is determined by apparatus discussed below with respect to Fig. 3.

Referring now to Fig. 3 a top view of the apparatus is shown with the lever 2 removed from the shaft 3. The shaft 3 has an area of larger cross section 51 of substantially rectangular shape which mates with a similarly shaped opening in a lug 52. The lug 52 has two projections 53 and 54, respectively which contact a lever 56 pivotally mounted at one of its ends by a pin 57 and its other end 58 being forked.

The forked end 58 of the lever 56 mates with a pin 59 which projects through an opening 60 in the plate 61. Also mounted on the plate 61 is a coil spring 62 having a resilient extension 63 as one of its ends and is fastened to the plate 61 through an opening 64 at its other end. The plate 61 is fastened to the rest of the mechanism by means of screws 66.

In operation, rotation of the shaft 3 in a clockwise direction causes the projecting end 53 of the lug 52 to pivot lever 56 about the pin 57 against the action of the resilient arm 63 of the coil spring 62. In this manner the forked end 58 of the lever 56 moves the pin 59 the length of the groove 60 which sets the clock-work with its escapement mechanism into operation. When the force rotating the shaft 3 is released the resilient arm 63 of the spring 62 acts to return the shaft 3 to its normal central position by bearing up against the projecting end 53 of the lug 52. However, due to the action of the conventional escapement mechanism the rate at which the lever 56 is moved back to its original position is controlled so that the shaft 3 is returned to its central position only after a predetermined time interval.

Similarly, it can be seen that rotation of the shaft 3 in a counterclockwise direction will cause the projecting end 54 of the lug 52 to pivot the lever 56 about the pin 57 in the same manner as explained hereinabove. The other portions of the apparatus illustrated in Fig. 3 will operate in the same manner to return the shaft 3 to its normal central position.

In operation of the entire device therefore, the switching mechanism can be used to initiate operation of a turn indicator which operates in the following manner:

Rotation of the shaft 3 in either the clockwise or the counterclockwise direction sets the clock-work with its escapement mechanism into operation and simultaneously causes the two switch contact pairs on one side of the cam 4 to be closed. In Fig. 2, for example, spring arm 5' is shown in contact with the terminal 10' and the spring arm 6' is shown in contact with the terminal 11'. This supplies the required voltage to the turning indicator 18 which is a conventional indicator in use in automotive vehicles today. Energization of the indicator 18 causes this arm 20 to be illuminated and swing out from its housing. The arm 20 will remain in this position until the the shaft 3 is returned to its normal central position. While the spring 62 shown in Fig. 3 is acting to return the shaft 3 to its central position the clock-work mechanism connected to the gear 39 of Fig. 1 rotates the ratchet 13 in the direction of the arrow. This causes the contacts 34 and 36 to repeatedly and alternately close and open until rotation of the ratchet 13 ceases. This occurs when the shaft 3 is returned to its normal central position. Since the switch made up of contact pairs 34 and 36 is in series with the switch made up of the contact 32 on the spring arm 6' and the terminal 11', the light 19 will be illuminated whenever the switch contacts 34 and 36 mate with one another. When these contacts are opened the light will be extinguished.

Therefore, for the predetermined time interval during which the shaft 3 is returned to its normal central position, the indicator arm 20 of the turn indicator 18 will be illuminated and extended and the light 19 will blink on and off at a rate dependent on the rate of opening and closing of the contacts 34 and 36.

It should be noted that the contact made between contacts 34 and 36 is a slightly sliding contact which is helpful to wipe away any dirt that may tend to form between these two contacts.

It will be understood that each of the elements described above, or two or more together, may also find a useful application in other types of switch mechanisms differing from the types described above.

While the invention has been illustrated and described as embodied in switch mechanisms for automotive vehicle turn indicators, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a switching mechanism, in combination, a support member; a shaft rotatably mounted on said support member; a first and a second electrically conductive leaf spring mounted on said support member, each of said leaf springs respectively having free end portions symmetrically disposed about said rotatable shaft, said leaf springs being electrically insulated from one another; a pair of spaced fixed electrically conductive contacts mounted on said support member and electrically insulated from one another, one of said first pair of contacts being arranged adjacent and spaced from one of said free end portions of said first leaf spring to form a first switch and the other of said first pair of contacts being arranged adjacent and spaced from the other of said free end portions of said first leaf spring to form a second switch; a second pair of spaced fixed electrically conductive contacts mounted on said support member and electrically insulated from one another, one of said second pair of contacts being arranged adjacent and spaced from one of the free end portions of said second leaf spring to form a third switch and the other of said second pair of contacts being arranged adjacent and spaced from the other of said free end portions of said second leaf spring to form a fourth switch; means mounted on said support member adjacent said leaf springs and adapted to cooperate with said shaft when the latter is rotated to engage one of said free end portions of said first leaf spring and one of said free end portions of said second leaf spring and move the same into electrical contact with their respective fixed contacts thereby closing the respective switches; a fifth switch mounted on said support member and movable between circuit opening and circuit closing positions, said fifth switch being adapted to be connected in series with said first and second switches; means for rotating said shaft through a predetermined angle so that one of said first and second switches is closed and one of said third and fourth switches is closed; and means mounted on said support member and actuated by said rotating means for repeatedly and alternately moving said fifth switch between its circuit opening and circuit closing positions whereby said closed first or second switch is rendered ineffective when said fifth switch is in circuit opening position and rendered effective when said fifth switch is in circuit closing position.

2. In a switching mechanism, in combination, a support member; a shaft rotatably mounted on said support member; at least one electrically conductive V-shaped leaf spring mounted on said support member at the base of the V thereof and having free end portions symmetrically disposed about said rotatable shaft; a pair of spaced fixed electrically conductive contacts mounted on said support member and electrically insulated from one another, one of said contacts being arranged adjacent and spaced from one of said free end portions of said leaf spring to form a first switch and the other of said contacts being arranged adjacent and spaced from one of said free end portions of said leaf spring to form a first switch and the other of said contacts being arranged adjacent and spaced from the other of said free end portions of said leaf spring to form a second switch; cam means mounted on said shaft and rotatable therewith; wear-resistant U-shaped spring means mounted at the base of the U thereof on the same part of said support member as said leaf spring and adapted to cooperate with said cam means when the latter is rotated to engage one of said free end portions of said leaf spring and move the same into electrical contact with its respective fixed contact thereby closing the respective switch; a third switch mounted on said support member and movable between circuit opening and circuit closing positions, said third switch being adapted to be connected in series with said first and second switches; means for rotating said shaft through a predetermined angle so that one of said first and second switches is closed; and means mounted on said support member and actuated by said rotating means for repeatedly and alternately moving said third switch between its circuit-opening and circuit closing positions whereby said one closed switch is rendered ineffective when said third switch is in circuit opening position and rendered effective when said third switch is in circuit closing position.

3. In a switching mechanism, in combination, a support member; a shaft rotatably mounted on said support member; a first and a second electrically conductive leaf spring mounted on said support member, each of said leaf springs respectively having free end portions symmetrically disposed about said rotatable shaft, said leaf springs being electrically insulated from one another; a first pair of spaced fixed electrically conductive contacts mounted on said support member and electrically insulated from one another, one of said first pair of contacts being arranged adjacent and spaced from one of said free end portions of said first leaf spring to form a first switch and the other of said first pair of contacts being arranged adjacent and spaced from the other of said free end portions of said first leaf spring to form a second switch; a second pair of spaced fixed electrically conductive contacts mounted on said support member and electrically insulated from one another, one of said second pair of contacts being arranged adjacent and spaced from one of the free end portions of said second leaf spring to form a third switch and the other of said second leaf spring to form a third switch and the other of said second pair of contacts being arranged adjacent and spaced from the other of said free end portions of said second leaf spring to form a fourth switch; first operating means mounted on said rotatable shaft adjacent said first leaf spring and adapted to cooperate therewith when said shaft is rotated to engage one of said free end portions of said first leaf spring and move the same into electrical contact with its respective switch; second operating means made of electrically insulating material and arranged between the free end portions of said first and second leaf springs and being moved by said free end portion of said leaf spring, when the latter is moved, into engagement with the respective free end portion of said second leaf spring to move the same into electrical contact with its respective fixed contact and close its respective switch; a fifth switch mounted on said support member and movable between circuit opening and circuit closing positions, said fifth switch being adapted to be connected in series with said first and second switches; means for rotating said shaft through a predetermined angle so that one of said first and second switches is closed and one of said third and fourth switches is closed; and means mounted on said support member and actuated by said rotating means for repeatedly and alternately moving said fifth switch between its circuit opening and circuit closing positions whereby said closed first or second switch is rendered ineffective when said fifth switch is in circuit opening position and rendered effective when said fifth switch is in circuit closing position.

4. In a switching mechanism, in combination, a support member; a shaft rotatably mounted on said support member; a first and a second electrically conductive leaf spring respectively having free end portions symmetrically disposed about said rotatable shaft, said leaf springs being electrically insulated from one another; a first pair of spaced fixed electrically conductive contacts mounted on said support member and electrically insulated from one another, one of said first pair of contacts being arranged adjacent and spaced from one of said free end portions of said first leaf spring to form a first switch and the other of said first pair of contacts being arranged adjacent and spaced from the other of said free end portions of said first leaf spring to form a second switch; a second pair of spaced fixed electrically conductive contacts mounted on said support member and electrically insulated from one another, one of said second pair of contacts being arranged adjacent and spaced from one of the free end portions of said second leaf spring to form a third switch and the other of said second pair of contacts being arranged adjacent and spaced from the other of said free end portions of said second leaf spring to form a fourth switch; means mounted on said support member adjacent said leaf springs and adapted to cooperate with said shaft when the latter is rotated to engage one of said free end portions of said first leaf spring and one of said free end portions of said second leaf spring and move the same into electrical contact with their respective fixed contacts thereby closing the respective switches; a fifth switch mounted on said support member and movable between circuit opening and circuit closing positions, said fifth switch being adapted to be connected in series with said first and second switches; means for rotating said shaft through a predetermined angle so that one of said first and second switches is closed and one of said third and fourth switches is closed; means mounted on said support member and actuated by said rotating means for repeatedly and alternately moving said fifth switch between its circuit opening and circuit closing positions whereby said closed first or second switch is rendered ineffective when said fifth switch is in circuit opening position and rendered effective when said fifth switch is in circuit closing position; a first pair of signalling means, each of said first pair of signalling means being respectively connected in circuit with one of said first pair of spaced electrically conductive contacts; a second pair of signalling means, each of said second pair of signalling means being connected respectively in circuit with one of said second pair of spaced electrically conductive contacts; and energizing means for energizing said signalling means and connected in circuit with said switches whereby when said shaft is rotated, one of said second pair of signalling means is continuously energized by said energizing means and one of said first pair of signalling means is energized only when said closed first or second switch is rendered effective.

5. In a switching mechanism, in combination, a support member; a shaft rotatably mounted on said support member; a first and a second electrically conductive leaf spring mounted on said support member, each of said leaf springs respectively having free end portions symmetrically disposed about said rotatable shaft, said leaf springs being electrically insulated from one another; a first pair of spaced fixed electrically conductive contacts mounted on said support member and electrically insulated from one another, one of said first pair of contacts being arranged adjacent and spaced from one of said free end portions of said first leaf spring to form a first switch and the other of said first pair of contacts being arranged adjacent and spaced from the other of said free end portions of said first leaf spring to form a second switch; a second pair of spaced fixed electrically conductive contacts mounted on said support member and electrically insulated from one another, one of said second pair of contacts being arranged adjacent and spaced from one of the free end portions of said second leaf spring to form a third switch and the other of said second pair of contacts being arranged adjacent and spaced from the other of said free end portions of said second leaf spring to form a fourth switch; means mounted on said support member adjacent said leaf springs and adapted to cooperate with said shaft when the latter is rotated to engage one of said free end portions of said first leaf spring and one of said free end portions of said second leaf spring and move the same into electrical contact with their respective fixed contacts thereby closing the respective switches; a fifth switch mounted on said support member and movable between circuit opening and circuit closing positions, said fifth switch being adapted to be connected in series with said first and second switches; means for rotating said shaft through a predetermined angle so that one of said first and second switches is closed and one of said third and fourth switches is closed; means mounted on said support member and actuated by said rotating means for repeatedly and alternately moving said fifth switch between its circuit opening and circuit closing positions for a predetermined time period whereby said closed first or second switch is rendered ineffective when said fifth switch is in circuit opening position and rendered effective when said fifth switch is in circuit closing position; a first pair of signalling means, each of said first pair of signalling means being respectively connected in circuit with one of said first pair of spaced electrically conductive contacts; a second pair of signalling means, each of said second pair of signalling means being connected respectively in circuit with one of said second pair of spaced electrically conductive contacts; and energizing means for energizing said signalling means and connected in circuit with said switches whereby when said shaft is rotated, one of said second pair of signalling means is continuously energized by said energizing means for said predetermined time period and one of said first pair of signalling means is energized only when said closed first or second switch is rendered effective.

References Cited in the file of this patent

UNITED STATES PATENTS

| | | |
|---|---|---|
| 1,870,682 | Heising et al. | Aug. 9, 1932 |
| 2,230,994 | Arbuckle et al. | Feb. 11, 1941 |
| 2,238,394 | Murray | Apr. 15, 1941 |

FOREIGN PATENTS

| | | |
|---|---|---|
| 922,832 | France | Feb. 10, 1947 |
| 1,046,878 | France | July 15, 1953 |